(12) United States Patent
Fabjanski et al.

(10) Patent No.: US 10,740,095 B2
(45) Date of Patent: Aug. 11, 2020

(54) ASSIGNING A COMPUTER TO A GROUP OF COMPUTERS IN A GROUP INFRASTRUCTURE

(71) Applicant: INTERNATIONAL BUSINESS MACHINES CORPORATION, Armonk, NY (US)

(72) Inventors: Krzysztof Fabjanski, Bielsko-Biala (PL); Marek Peszt, Cracow (PL); Agnieszka Tkaczyk, Cracow (PL); Piotr J. Walczak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,759

(22) Filed: Nov. 27, 2018

(65) Prior Publication Data

US 2019/0095199 A1    Mar. 28, 2019

Related U.S. Application Data

(63) Continuation of application No. 15/042,178, filed on Feb. 12, 2016, now Pat. No. 10,169,033.

(51) Int. Cl.
*G06F 8/71*      (2018.01)
*G06F 8/61*      (2018.01)
*H04L 12/24*    (2006.01)

(52) U.S. Cl.
CPC .................. *G06F 8/71* (2013.01); *G06F 8/61* (2013.01); *H04L 41/0893* (2013.01)

(58) Field of Classification Search
CPC ....................................................... G06F 8/71
USPC ......................................................... 709/224
See application file for complete search history.

(56) References Cited

U.S. PATENT DOCUMENTS

| | | | | |
|---|---|---|---|---|
| 5,483,658 | A | * | 1/1996 | Grube .................. G06F 11/006 705/59 |
| 6,009,455 | A | * | 12/1999 | Doyle .................. G06F 9/5072 709/201 |
| 6,782,350 | B1 | | 8/2004 | Burnley et al. |
| 6,938,027 | B1 | | 8/2005 | Barritz et al. |
| 7,174,332 | B2 | | 2/2007 | Baxter et al. |
| 7,188,170 | B1 | | 3/2007 | Burnley et al. |

(Continued)

OTHER PUBLICATIONS

Cohen et al., "A Comparison of String Metrics for Matching Names and Records", 2003 (Year: 2003).*

(Continued)

*Primary Examiner* — Ondrej C Vostal
(74) *Attorney, Agent, or Firm* — Anthony M. Pallone

(57) ABSTRACT

Assigning a given computer to a computer group of a set of computer groups. Software components installed on the given computer are scanned, resulting in a list of discovered software components of the given computer. In addition, for each computer group of the set of computer groups, a list of software components most frequently installed on the computers of the computer group is obtained. For each computer group, the list is compared with the list of discovered software components and, based on the comparison, a likelihood that the given computer belongs to the computer group is computed. In case only one of the likelihoods exceeds a threshold, the given computer is assigned to the respective computer group for which the likelihood exceeds the threshold.

19 Claims, 6 Drawing Sheets

(56) References Cited

U.S. PATENT DOCUMENTS

| | | | |
|---|---|---|---|
| 7,506,038 B1 | 3/2009 | Perrone et al. | |
| 7,584,300 B2* | 9/2009 | Fukuzato | G06F 8/61 |
| | | | 709/240 |
| 7,657,605 B2* | 2/2010 | Blohm | G06F 8/65 |
| | | | 709/206 |
| 7,712,138 B2 | 5/2010 | Zobel et al. | |
| 7,970,745 B2* | 6/2011 | Norcott | G06F 16/211 |
| | | | 707/694 |
| 8,239,915 B1 | 8/2012 | Satish et al. | |
| 8,671,120 B1* | 3/2014 | Bicknell | G06Q 10/08 |
| | | | 707/804 |
| 8,751,629 B2 | 6/2014 | White et al. | |
| 9,082,148 B1* | 7/2015 | Oczkowski | G06Q 30/0601 |
| 9,304,980 B1 | 4/2016 | Hartsook et al. | |
| 2002/0174422 A1 | 11/2002 | Kelley et al. | |
| 2004/0221267 A1* | 11/2004 | Chase | G06F 8/61 |
| | | | 717/121 |
| 2004/0236853 A1 | 11/2004 | Jacobs et al. | |
| 2004/0254863 A1 | 12/2004 | Jones et al. | |
| 2005/0257251 A1* | 11/2005 | McKune | G06F 21/10 |
| | | | 726/4 |
| 2006/0036656 A1 | 2/2006 | Mercer | |
| 2006/0041457 A1 | 2/2006 | Mueller et al. | |
| 2006/0253794 A1 | 11/2006 | Wilson | |
| 2006/0272020 A1 | 11/2006 | Gardner | |
| 2007/0299858 A1 | 12/2007 | Norcott | |
| 2008/0059302 A1 | 3/2008 | Fordyce, III et al. | |
| 2008/0086509 A1 | 4/2008 | Wallace | |
| 2008/0092197 A1* | 4/2008 | Koh | G06F 8/65 |
| | | | 725/132 |
| 2008/0120723 A1 | 5/2008 | Carter et al. | |
| 2009/0063318 A1 | 3/2009 | Alonzo et al. | |
| 2010/0049838 A1 | 2/2010 | DeHaan | |
| 2010/0057890 A1 | 3/2010 | DeHaan | |
| 2011/0023123 A1 | 1/2011 | King et al. | |
| 2011/0050423 A1 | 3/2011 | Cova et al. | |
| 2011/0112869 A1* | 5/2011 | Greak | G06Q 30/06 |
| | | | 705/4 |
| 2012/0185945 A1 | 7/2012 | Andres et al. | |
| 2013/0110903 A1 | 5/2013 | Myerscough et al. | |
| 2013/0124212 A1 | 5/2013 | Scoggins, II et al. | |
| 2013/0247207 A1 | 9/2013 | Hugard, IV et al. | |
| 2013/0301444 A1 | 11/2013 | Sachs et al. | |
| 2014/0101061 A1* | 4/2014 | Boudreau | G06F 21/10 |
| | | | 705/317 |
| 2014/0283008 A1 | 9/2014 | Daino et al. | |
| 2015/0058316 A1* | 2/2015 | Bruno | G06F 16/2453 |
| | | | 707/718 |
| 2015/0106145 A1 | 4/2015 | Hamilton et al. | |
| 2015/0365399 A1* | 12/2015 | Biswas | G06F 9/00 |
| | | | 726/8 |
| 2015/0365437 A1 | 12/2015 | Bell, Jr. et al. | |
| 2016/0042320 A1* | 2/2016 | Dearing | G06Q 10/08355 |
| | | | 705/338 |
| 2016/0149763 A1 | 5/2016 | Ingram et al. | |
| 2016/0328223 A1 | 11/2016 | Giri et al. | |
| 2016/0381056 A1 | 12/2016 | Floering | |
| 2017/0237646 A1 | 8/2017 | Fabjanski et al. | |

OTHER PUBLICATIONS

Levenshtein, "Binary Codes Capable of Correcting Deletions, Insertions, and Reversals", 1966 (Year: 1966).*

Merriam-Webster, "likelihood", 2018 (Year: 2018).*

Wikipedia, "Levenshtein distance", 2019 (Year: 2019).*

Wikipedia, "Likelihood function", 2018 (Year: 2018).*

IBM: List of IBM Patents or Patent Applications Treated as Related (Appendix P), Dec. 5, 2018, 2 pages.

Cohen et al., "A Comparison of String Metrics for Matching Names and Records", American Association for Artificial Intelligence, 2003, 6 pages.

Cormode et al., "The String Edit Distance Matching Problem With Moves", ACM Trans. Algor. vol. 3, No. 1, Article 2, Feb. 2007, 19 pages.

Merriam-Webster Dictionary, "Likelihood", 2018, p. 1.

Ristad et al., "Learning String-Edit Distance", IEEE Transactions on Pattern Analysis and Machine Intelligence, vol. 20, No. 5, May 1998, pp. 522-532.

Wikipedia, The Free Encyclopedia, "Likelihood function", 2018, p. 1.

* cited by examiner

ASSIGNING A COMPUTER TO A GROUP OF COMPUTERS IN A GROUP INFRASTRUCTURE

BACKGROUND

Embodiments of the invention relate generally to the field of digital computer systems, and more specifically, to a method of assigning a new computer to a particular group of computers in a group infrastructure.

Manual assignment of a new computer to a particular group can be a time-consuming and troublesome procedure. It is important that the new computer be assigned to the correct group since bundling rules for determining how its software components are bundled into existing software products may depend on the group to which the computer is assigned.

SUMMARY

Various embodiments of the present invention provide a system and method to assign a given computer to a group of computers. Once the given computer has been assigned to a particular group of computers, bundling rules for that group may be applied to the newly assigned computer to determine how software components resident on it can be bundled into software products.

Embodiments of the present invention disclose a computer-implemented method, system, and computer program product for assigning a computer to a computer group of a set of computer groups. Software components installed on the given computer are scanned, resulting in a list of discovered software components of the given computer. Further, for each computer group of the set of computer groups, a list of software components most frequently installed on the computers of the computer group is obtained, where, for each computer group, the list is compared with the list of discovered software components and, based on the comparison, a likelihood that the given computer belongs to the computer group is computed. In case only one of the likelihoods exceeds a threshold, the given computer is assigned to the computer group for which the likelihood exceeds the threshold.

DETAILED DESCRIPTION

Figure 1:
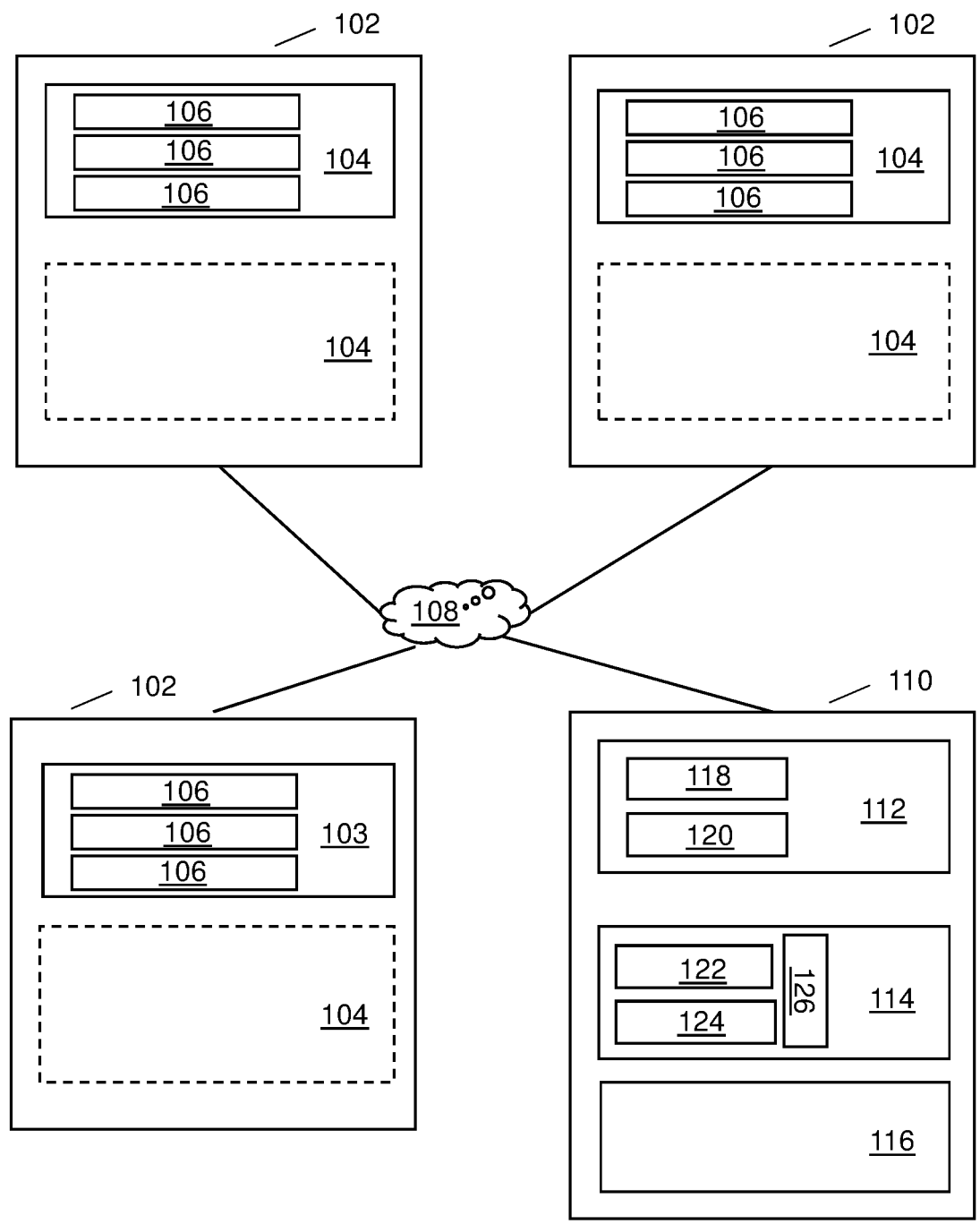
FIG. 1 is a functional block diagram illustrating a computer network of computer groups and a central server, in accordance with an embodiment of the present invention.

The descriptions of the various embodiments of the present invention are presented for purposes of registration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments herein disclosed.

Large organizations generally consist of many departments or groups, each containing numerous computers assigned to the particular department or group. Normally, computers belonging to a particular group have many of the same software components installed on them. This is a distinguishing feature of such a group infrastructure.

The question arises as to how to assign a given computer to a particular group. Manual assignment of a given computer to a group can be time consuming, especially when an organization has many groups with many computers to be assigned to those groups. The present method may indicate a means to assign a given computer to a particular group by taking advantage of the group infrastructure and the fact that the computers belonging to a particular group have many of the same software components installed on them. Comparisons of the software components installed on a given computer to those installed on a particular group are made, and thereby, a determination is made of the likelihood of the given computer belonging to a particular group. This may have the advantage that the method can be automatically implemented. Another advantage may be that the assignment of the given computer to a particular computer group can be achieved with increased confidence. This may have the advantage of saving time since one can be relatively certain that the given computer has been assigned to the correct group and thus, iterating to find the right group to assign the given computer to can be reduced. This may be advantageous in that the whole process of assigning a given computer to a particular computer group may be made more efficient.

Assignment of computer to groups may be beneficial for many different purposes. For example, updating computers with updated software components may often require consideration of dependencies between different software components. A first software component may not be compatible with a second software component as long as software component versions do not satisfy a certain relationship. In a practical example, software component A with version 1.0 is compatible with software component B version 1.7 but not with software component B version 1.9. Thus updating of software component B version 1.5 to 1.7 also requires a certain update of software component A. All these dependencies between software components can more easily be considered when updating computers. Since all computers in a certain computer group have a same or highly similar installation of software components, it may only be necessary to define one update routine per computer group rather than considering each computer individually and individually deciding which kind of updates to perform to which software components.

In another example, assignment of computers to groups may be beneficial in case of license management. License packages may be provided for bundles of software components. However, instead of determining individually for each computer the available software components and thereupon selecting various license packages for this computer, the selection of the license packages is performed per computer group. In case of a large number of software components and license packages, the computer resources required for grouping the computers into different groups and then performing the determining of the license packages per group are much less than required for performing a respective computer specific analysis.

In yet another example, debugging of computers may be simplified if they are pre-grouped into different computer groups. Since in each group the installed software components are similar, debugging the software components should result in similar results. However, if for one computer in such a group the debugging results deviate significantly from the debugging results of other computers in the group, this may indicate a hardware-related problem with the computer. Thus, the method of the invention may provide a tool for checking the operability of the hardware of a computer.

The term 'Levenshtein distance' is a measure of the similarity between two strings, a source string and a target string. The Levenshtein distance is the number of deletions, insertions, or substitutions required to transform the source string into the target string. The greater the Levenshtein distance, the more dissimilar the strings are. The minimum Levenshtein distance is 0, while the maximum possible Levenshtein distance between two strings is the maximum length of the two strings under comparison.

The term 'software component' refers to a unit of software that can be detected as installed or running on computer systems independently of other software items.

The term 'software product' refers to a logical unit of software packaging and sharing that has a managed development and maintenance lifecycle and customer-visible attributes. It can be a collection of software components, software products, and other offerings.

The term 'bundling rule' refers to a means of defining how software components are combined into software products.

According to one embodiment of the invention, assigning a given computer to a group of computers further comprises: in case none of the first likelihoods exceeds the first threshold or two or more first likelihoods exceed the first threshold, obtaining for each computer group a second list of software installed on the computers of the computer group. The second list comprises software components installed on the computers of the computer group which are not included in the first list of the computer group. For each computer, the method further comprises comparing the second list with the list of discovered software components, and based on the comparison and the first likelihood, computing a second likelihood that the given computer belongs to the computer group. In case only one of the second likelihoods exceeds a second threshold, the given computer is assigned to the computer group for which the second likelihood exceeds the second threshold. This may have the advantage of adding the given computer to the particular computer group with a high degree of confidence.

According to one embodiment, the method for assigning a given computer to a group of computers further comprises: in case none of the second likelihoods exceeds the second threshold or two or more second likelihoods exceed the second threshold, obtaining for each computer group a third list of software components installed on computers of the computer group. The third list comprises software components most frequently installed on the computers of the computer group. Furthermore, for each computer group, the method comprises using a Levenshtein distance procedure to compare the third list with the list of discovered software components and, based on the comparison, selecting the computer group which has an average closest Levenshtein distance match. For the computer group with the average closest distance match, the calculated Levenshtein distances and the second likelihood determined for the computer group are used to compute a third likelihood that the given computer belongs to the computer group; in case the third likelihood exceeds a third threshold, the given computer is assigned to the computer group for which the third likelihood exceeds the third threshold. This may have the advantage that if the third likelihood exceeds the third threshold, there is a relatively high certainty that the given computer belongs to the particular group.

According to another embodiment, in case the third likelihood for the computer group does not exceed the third threshold, a new computer group in the set of computer groups is created, and the given computer is assigned to the new computer group. This may have the advantage that a given computer most likely does not belong to any of the existing computer groups and thus should be assigned to a newly created group.

According to an embodiment, whereby, in case the given computer is assigned to the computer group for which the first likelihood exceeds the first threshold, the method comprises updating the first list of the computer group to account for the software components installed on the newly added given computer. This may have the advantage that the first list of components most frequently installed on the computers comprising the particular group is kept up-to-date, thereby ensuring that for future comparisons, the newly assigned given computer's contribution to the group is taken into account.

According to a further embodiment, for the case that the given computer is assigned to the computer group for which the second likelihood exceeds the second threshold, the method comprises updating the first and second lists of the computer group to account for the software components installed on the newly added computer, thereby having the potential advantage that for future comparisons for a given computer, the first and second lists are up-to-date and account for all computers contained in the group.

According to one embodiment, where in the case that the given computer is assigned to the respective computer group for which the third likelihood exceeds the third threshold, the method comprises updating the third list of the computer group to account for the software components installed on the newly added computer. This may have the advantage that for future comparisons to assign a given computer to a particular group, the third list of each computer group is up-to-date and reflects the software components contained on the computers belonging to it.

According to another embodiment in which the third likelihood for the computer group does not exceed the third threshold, and the given computer is added to a newly created computer group, the method further comprises creating a new first list for the newly created computer group. This may have the advantage that the newly created group has a first list available which then can be used for future comparisons for a newly given computer to be added to a particular computer group.

According to another embodiment, obtaining the first list of software components most frequently installed on the computers of the computer group comprises: obtaining a list for the software components installed on the computers of the computer group; sorting the list of the software components according to how frequently the software components are installed on the computer group, the first list comprising the first N most frequently used software components from the list. This may have the advantage that there is a straightforward means for determining the components appearing on the first list.

According to another embodiment, for each computer group, the union of the first and second lists is equal to all the software components installed on the computers belonging to the computer group. This may have the advantage that all software contained on the computers belonging to the computer group is accounted for in the first and second lists for use in the comparisons with the given computer.

According to an embodiment, the first list for each computer group is unique for each of the computer groups. This may have the advantage that it is clear which list belongs to which computer group and that confusion between computer groups can be avoided.

According to another embodiment, the method of assigning a given computer to a computer group further comprises assigning each of the discovered software components installed on the given computer a first globally unique identifier (GUID), and assigning each of the software components of the first list a second GUID. In addition, the comparison between the first list and the list of discovered software components comprises comparing the respective first and second GUIDs, and the computation of the first likelihood comprises calculating the ratio of the number of matching first and second GUIDs to the number of software components comprised in the first list. This may have the advantage that a relatively straightforward means of comparing the components on the given computer to the components contained in the first list is achieved. Also, since each GUID is unique, this may have the advantage that confusion may be avoided.

According to another embodiment in which none of the first likelihoods exceeds the first threshold or two or more first likelihoods exceed the first threshold, each of the discovered software components installed on the given computer has a first globally unique identifier (GUID) assigned, and each of the software components of the second list has a second GUID assigned. The comparison between the second list and the list of discovered software components comprises comparing the respective first and second GUIDs. Computing the second likelihood comprises calculating the ratio of the number of matching first and second GUIDs to the number of software components comprised in the second list and computing the arithmetic mean of the ratio and the first likelihood to arrive at the second likelihood. This may have the advantage that a simple means of determining the second likelihood is achieved by the use of the GUIDs. Further, because of the uniqueness of the GUIDs, this may have the advantage that potential confusion may be avoided.

According to another embodiment, for the case that none of the second likelihoods exceeds the second threshold or two or more second likelihoods exceed the second threshold, obtaining the third list of software components most frequently installed on the computers of the computer group comprises: obtaining a list of all of the software components installed on the computers of the computer group; sorting the list of the software components according to how frequently the software components are installed on the computer group, the third list comprising the first M most frequently used software components from the list, where M is a predefined number. This may have the advantage of providing a straightforward means of determining the contents of the third list.

According to another embodiment, the Levenshtein distance procedure comprises comparing the name combinations of the software components in the third list and the list of discovered software components, the procedure resulting in a calculated Levenshtein distance for each compared name combination. For each name combination, the ratio between the calculated Levenshtein distance and the number of characters in the longest name of the name combination is computed, and an average Levenshtein distance match is determined as the arithmetic mean of the computed ratios. The average closest Levenshtein distance match is computed as the maximum of the average Levenshtein distance matches over all computer groups. This may have the advantage that a means is given to select the computer group having the closest Levenshtein distance match with the given computer.

According to a further embodiment, computing the third likelihood comprises calculating the mean of the average closest Levenshtein distance match and the second likelihood. This may have the advantage of providing a means to determine the third likelihood to see if the given computer belongs to the particular computer group.

According to another embodiment, after assigning the given computer to the respective computer group for which the first likelihood exceeds the first threshold, predefined bundling rules are obtained for the computer group, each bundling rule assigning combinations of software components to bundled software products. For the given computer assigned to the respective computer group for which the first likelihood exceeds the first threshold, the bundled software products installed on the computer are determined using the bundling rules for a particular group. This may have the advantage that bundling rules for the given computer can be determined and thus show how its resident software components should be bundled into software products.

According to another embodiment, after assigning the given computer to the respective computer group for which the first likelihood exceeds the first threshold, and the bundling rules for the computer group have been applied to the software components resident on the given computer, the method further comprises updating a software product list with information on the determined bundled software products. The software product list comprises for the respective computer group for which the first likelihood exceeds the first threshold, all the bundled software products installed on the computers of the computer group. This may have the advantage that a current list of all software products contained on the computers of the computer group is maintained.

FIG. 1 depicts a computer group 102 and a central administrative computer 110 connected to each other by a network hub 108. Each computer group 102 comprises one or more computers 104. On each computer 104, one or more software components 106 are installed. The central computer 110 comprises a processor 112, a memory 114, and an input/output interface 116. The processor 112 is comprised of an event handler 118, which detects the presence of a new given computer to be added to one of the computer groups and a comparator 120, which performs the comparisons necessary to determine to which computer group the newly given computer belongs to. Furthermore, the memory 114 includes all of the first lists 122, all of the second lists 124, and a table 126 comprising all of the Levenshtein data. In the present embodiment, one of the pre-existing computer groups 102 is shown with the newly given computer 103 assigned to it. On the newly given computer 103 are resident software components 106 installed.

Figure 2:
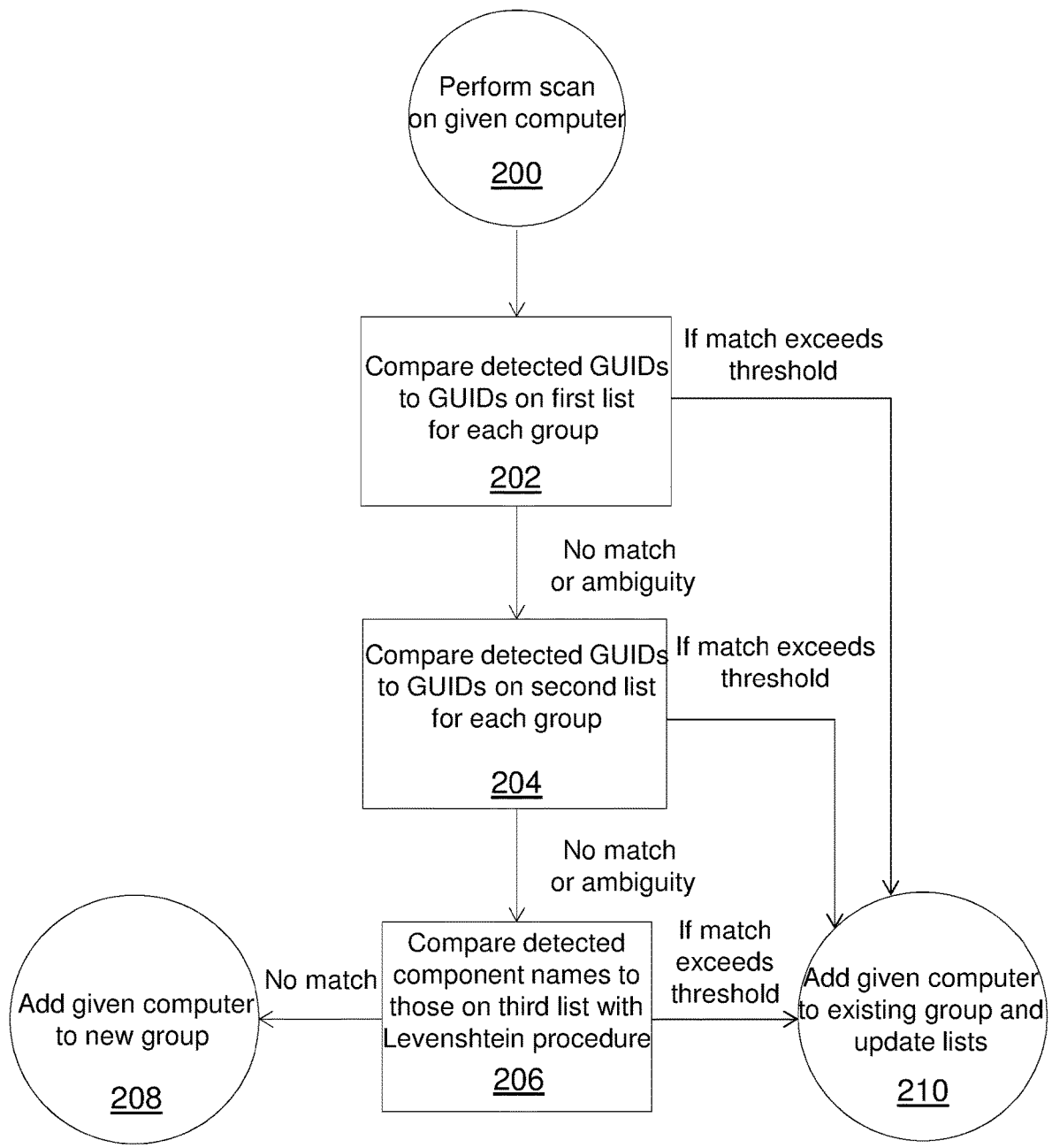
FIG. 2 is a flowchart depicting various steps in assigning a given computer to a computer group, in accordance with an embodiment of the present invention.

For the computer network shown in FIG. 1, FIG. 2 depicts a flowchart of the method to assign a given computer 103 of FIG. 1 to a computer group 102 in FIG. 1. In block 200, the central computer 110 in FIG. 1 detects the presence of the given computer 103 in FIG. 1 and performs a scan of the resident software 106 in FIG. 1 installed on it. In block 202, the comparator 120 in FIG. 1 performs a comparison between the detected GUIDs of the software components 106 in FIG. 1 installed on the given computer 103 in FIG. 1 with the GUIDs of the first list of each of the pre-existing computer groups 102 in FIG. 1. The comparator then computes the number of matching GUIDs between the given computer 103 in FIG. 1 and the GUIDs on the respective pre-existing computer group 102 of FIG. 1. For each computer group, the ratio of the number of matching GUIDs to the number of components in the group's first list is then computed. Thus, each computer group 102 in FIG. 1, has a ratio assigned to it. This ratio corresponds to the first likelihood. In case only one of the first likelihoods exceeds a predefined first threshold, the given computer is assigned to the respective computer group for which the first likelihood exceeds the first threshold in block 210. When this is accomplished, the first list for that particular computer group is updated to reflect the presence of the given computer newly added to the group.

In case none of the first likelihoods for the respective computer groups 102 in FIG. 1 exceeds the first threshold or two or more first likelihoods exceed the first threshold, the method proceeds to block 204. In block 204, the comparator 120 in FIG. 1 performs a comparison of the GUIDs of the software components 106 in FIG. 1 installed on the given computer 103 of FIG. 1 to the respective GUIDs on each of the second lists of the pre-existing computer groups 102 of FIG. 1. For each computer group, the ratio of matching GUIDs to the number of software components contained on the second list is computed by the comparator. Thus, each computer group 102 of FIG. 1 has a ratio corresponding to it. Each ratio is then averaged with the first likelihood previously computed for the respective group to arrive at the second likelihood for the respective group. In case only one of the second likelihoods exceeds a second threshold, in block 210, the given computer is assigned to the computer group for which the second likelihood exceeds the second threshold. In such a case, the first and second lists for that particular computer group are updated to account for the newly added given computer.

In case none of the second likelihoods for respective computer groups 102 in FIG. 1 exceeds the second threshold or two or more second likelihoods exceed the second threshold, the method proceeds to block 206. In block 206, for each computer group, the comparator 120 in FIG. 1 performs a Levenshtein distance procedure to compare the third list for each computer group with the list of discovered software component names 106 of FIG. 1 installed on the given computer 103 in FIG. 1. Based on this comparison, comparator selects the computer group which has an average closest Levenshtein distance match. For the computer group with the average closest Levenshtein distance match, the calculated Levenshtein distances and the second likelihood determined for the computer group are averaged to compute a third likelihood that the given computer belongs to the computer group. In case the third likelihood exceeds a third threshold, in step 210 the given computer is assigned to the computer group for which the third likelihood exceeds the third threshold. In addition, the first and second lists for that particular computer group are updated to account for the newly added given computer. In case the third likelihood does not exceed the third threshold, the method proceeds to block 208 in which a new computer group is created and the given computer 103 of FIG. 1 is assigned to this new group. Furthermore, the central computer 110 of FIG. 1 determines a first and second list for this new group.

Figure 3:
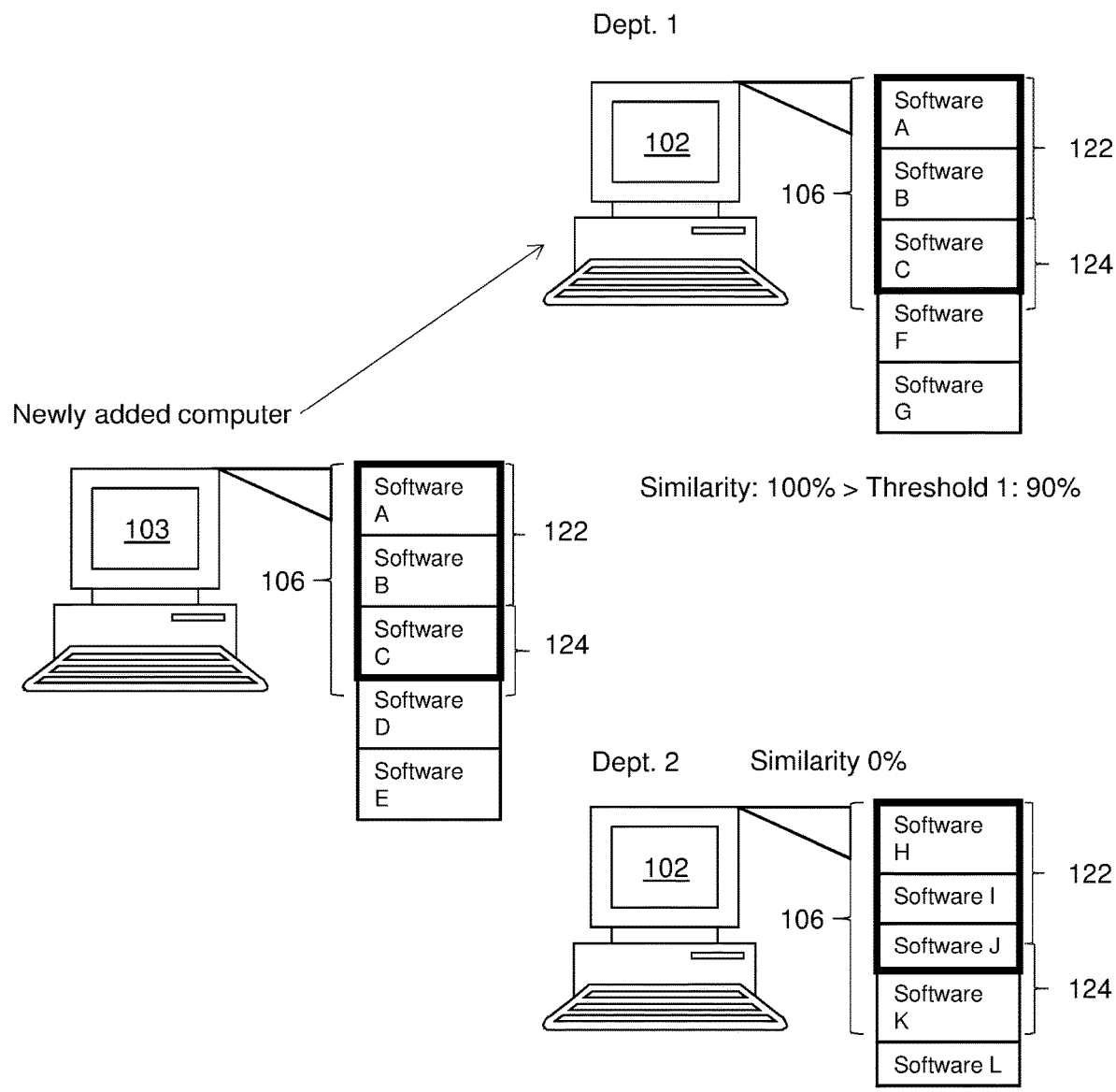
FIG. 3 illustrates a first comparison of a given computer to computer groups, in accordance with an embodiment of the present invention.

FIG. 3 depicts a first comparison of the given computer 103 of FIG. 1 to the given computer groups 102 of FIG. 1, wherein the first comparison comprises comparing the software components 106 of FIG. 1 installed on the given computer to the respective first lists 122 of FIG. 1 of the respective existing computer groups. This first comparison proceeds according to blocks 200 and 202 shown in the flowchart of FIG. 2. In FIG. 3, the first list 122 of FIG. 1 is shown for each respective computer group 104 of FIG. 1. This list comprises the N most frequently appearing software components 106 of FIG. 1 appearing on the respective computer group. The first likelihood is computed as described above for block 202 in FIG. 2, and in case only one of the first likelihoods exceeds a first threshold, the given computer is assigned to the computer group for which the first likelihood exceeds the first threshold. This is shown in block 210 of FIG. 2.

Figure 4:
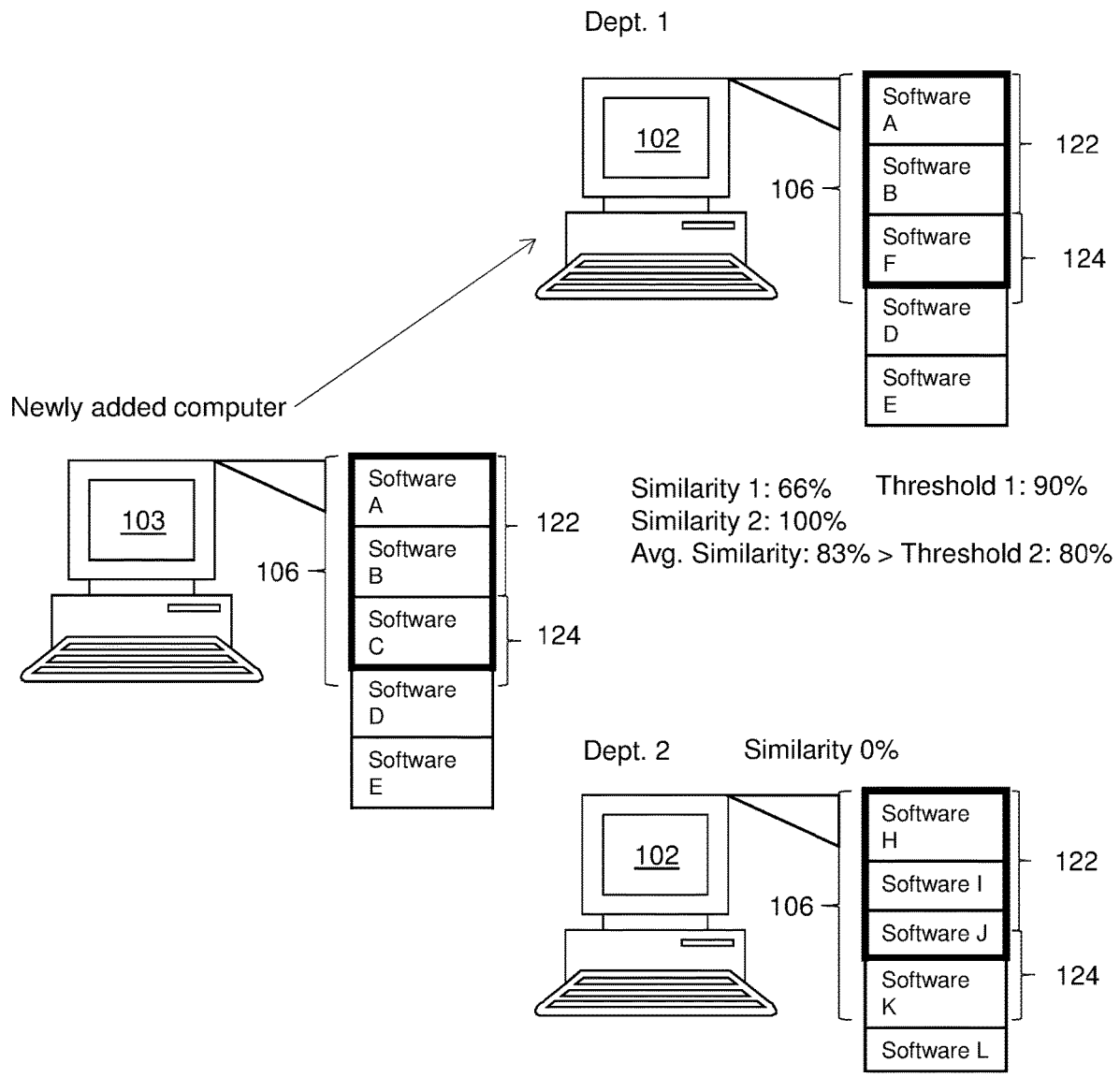
FIG. 4 depicts a second comparison of a given computer to computer groups, in accordance with an embodiment of the present invention.

In case none of the first likelihoods for a respective computer group 104 in FIG. 1 exceeds the first threshold or two or more first likelihoods exceed the first threshold, the method then proceeds to the second comparison depicted in FIG. 4. This corresponds to block 204 shown in FIG. 2 and described in detail above. In FIG. 4, the software components 106 of FIG. 1 installed on the given computer 103 of FIG. 1 are compared to the respective second lists 124 of FIG. 1 of each existing computer group 102 of FIG. 1. The second list of each computer group comprises all those software components 106 on FIG. 1 installed on the computers comprising the computer group not appearing on the first list. For each computer group, the number of matching GUIDs of the components between the given computer and the GUIDs of the components of the second list of the group is computed. Then the ratio of this number to the number of components comprising the second list of the particular group is calculated. Further, the second likelihood is then calculated by averaging the first likelihood with this newly calculated ratio. As shown in block 204 of FIG. 2, in case only one of the second likelihoods exceeds a second threshold, the given computer 103 of FIG. 1 is assigned to the respective computer group 104 of FIG. 1 for which the second likelihood exceeds the second threshold. This is shown in block 210 of FIG. 2.

Figure 5:
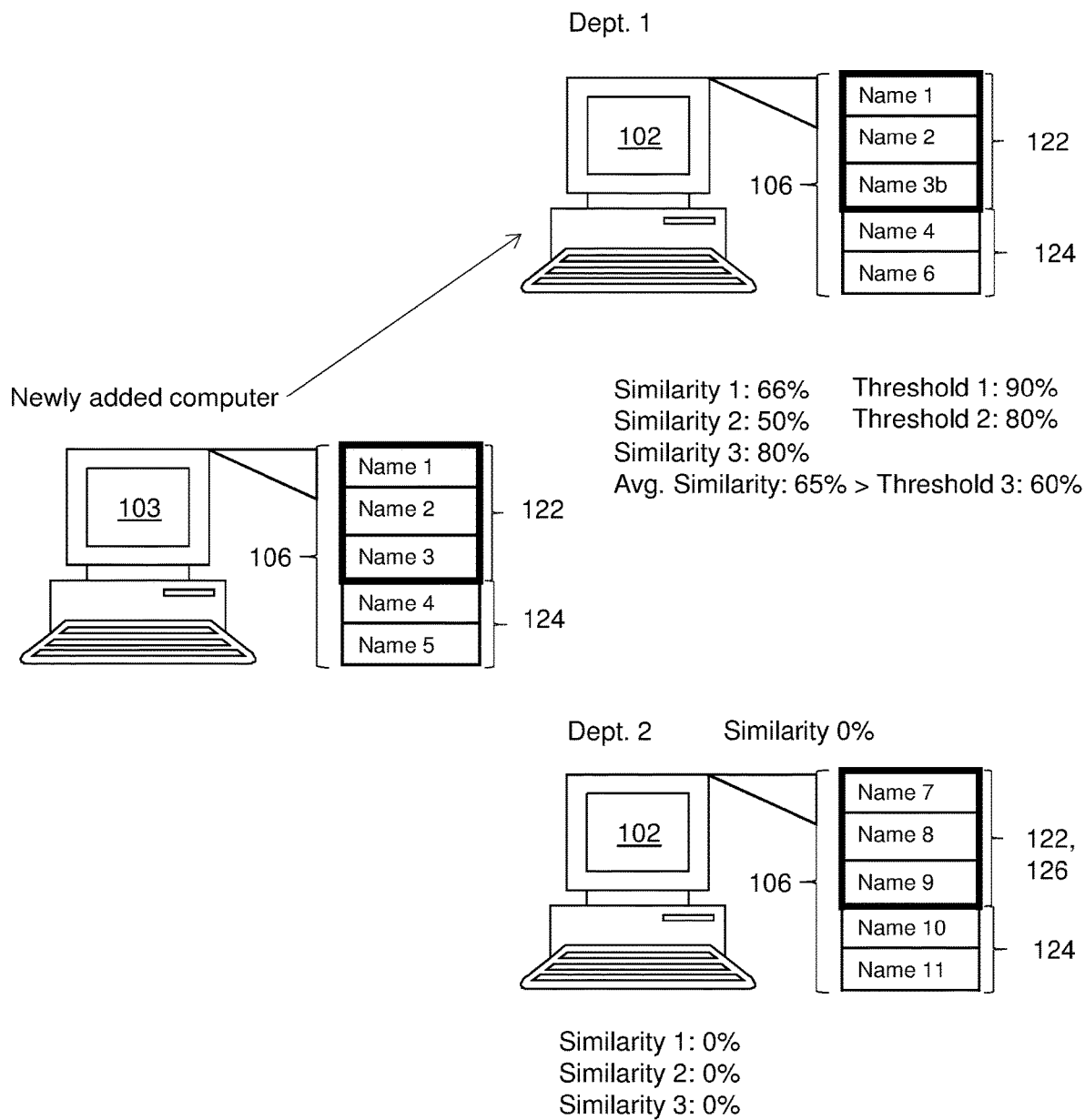
FIG. 5 shows a third comparison, using the Levenshtein method, of a given computer to computer groups, in accordance with an embodiment of the present invention.

In case none of the second likelihoods for a respective computer group exceeds the second threshold or two or more second likelihoods exceed the second threshold, the method proceeds to block 206 of FIG. 2 described in detail above. This is depicted in FIG. 5, whereby a third comparison by the Levenshtein method of the given computer 103 in FIG. 1 to the existing computer groups 102 of FIG. 1 is depicted. Here, the third list 126 of FIG. 1 comprising software components most frequently installed on the computers of the computer group is determined. For each computer group 102 of FIG. 1, a Levenshtein distance procedure is used to compare the third list with the list of discovered software components 106 of FIG. 1 installed on the given computer 103 of FIG. 1. For each computer group 102 of FIG. 1, the computed Levenshtein distances are then averaged. The existing computer group 102 of FIG. 1 with the maximum average Levenshtein distance match is then selected by the comparator 120 in FIG. 1. For this group, a third likelihood is calculated by averaging its average closest Levenshtein distance match and the previously computed second likelihood from FIG. 4. In case the third likelihood for the computer group exceeds a third threshold, the given computer 103 of FIG. 1 is assigned to the computer group 102 for which this third likelihood exceeds the third threshold. This is also depicted in block 210 of FIG. 2. If the third likelihood does not exceed the third threshold, a new computer group in the set of computer groups 102 of FIG. 1 is created, and the given computer 103 of FIG. 1 is assigned to this new computer group as depicted in block 208 of FIG. 2.

Figure 6:
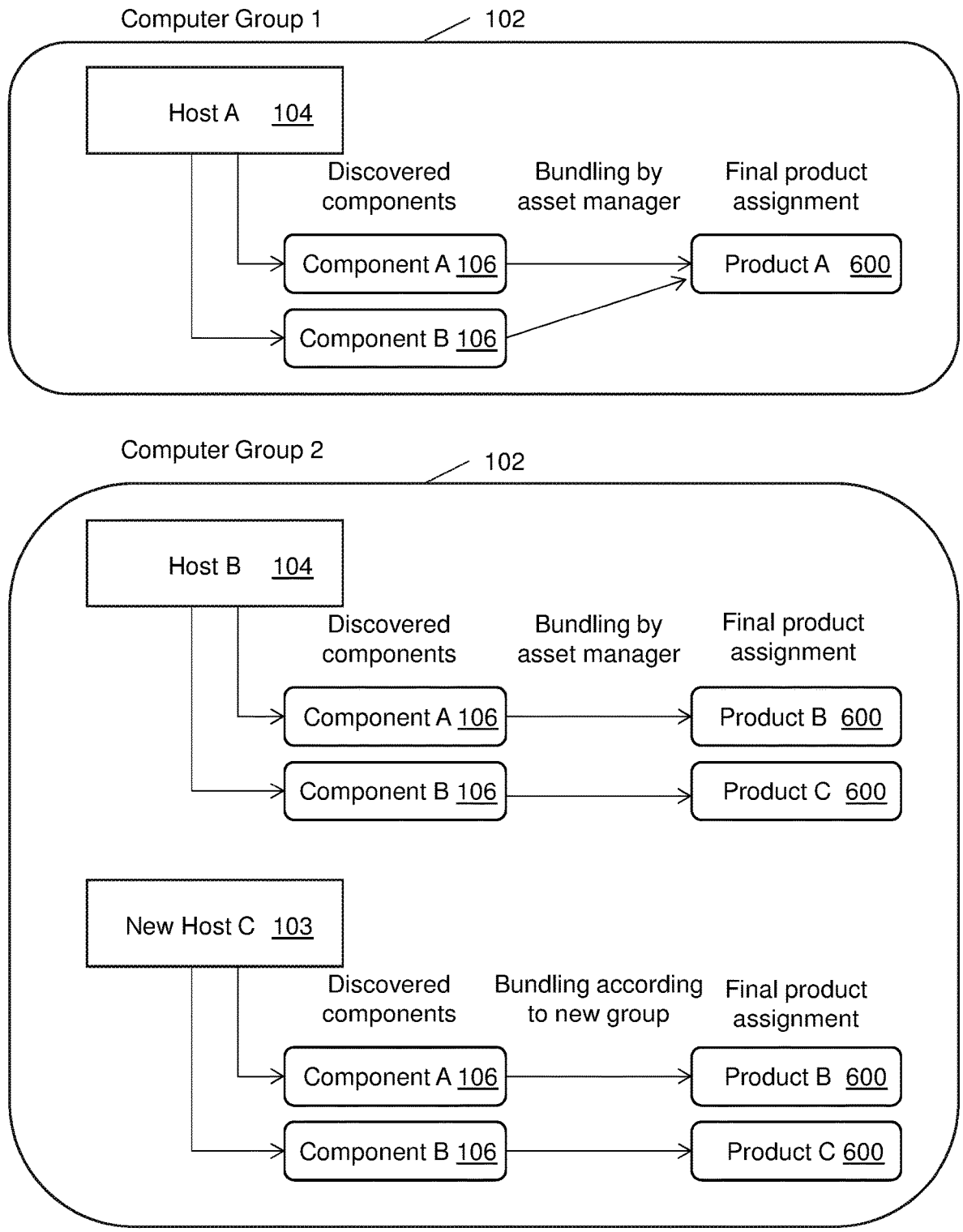
FIG. 6 illustrates an automatic bundling rule procedure for a given computer after group assignment, in accordance with an embodiment of the present invention.

Once a given computer 103 of FIG. 1 has successfully been added to a pre-existing computer group 102 of FIG. 1 by any of the methods depicted in FIGS. 3, 4, 5, the method then proceeds to the steps shown in FIG. 6. This is for the case wherein the given computer 103 of FIG. 1 has been assigned to a pre-existing computer group 102 of FIG. 1 and not assigned to a newly created computer group. Here, in FIG. 6, the automatic bundling rule procedure for the given computer 103 of FIG. 1 after group assignment is shown. Each pre-existing computer group 102 of FIG. 1 has pre-defined bundling rules which indicate how software components 106 of FIG. 1 installed on computers of the group are bundled together into software products 600. Thus, the bundling rules for the computer group to which the given computer 103 of FIG. 1 has been assigned are applied to the software components 106 of FIG. 1 installed on the given computer 103 of FIG. 1. The application of these bundling rules to the software components then results in software products 600.

In an organization divided into departments, each department is a separated instance which works in isolation from other departments. Each department comprises a computer group 102 of FIG. 1 comprised of one or more computers 104 in FIG. 1. To administer the computer groups of the various departments, an asset management tool, which is an example of the event handler 118 in FIG. 1 and comparator 120 in FIG. 1 is used to create computer/scan groups that logically represent all departments existing in the organization. Relying on this division, the asset management tool can execute software scan recognition in the computer groups.

Having computer groups defined, the asset management tool can determine the first list 122 of FIG. 1 for each computer group 102 of FIG. 1. The first list comprises the first N most frequently used software components 106 of FIG. 1 installed on the computers comprising each computer group 102 of FIG. 1. This concept relies on the fact that some software components 106 of FIG. 1 are used more frequently in some departments than in others. Having the top N report generated from all computers per given department, an adjustable threshold can be applied to cut the bottom of the top N report and thus generate a 'blacklist' of software components 106 of FIG. 1 per department/computer group 102 of FIG. 1. This blacklist then becomes the second list 124 of FIG. 1.

For every existing computer group 102 of FIG. 1, the list of the top N GUIDs is created. Each GUID from the list is compared to the GUIDs discovered on the new given computer 103 of FIG. 1. If two GUIDs match, the coefficient that defines the number of matching components is incremented. If the GUIDs do not match, the coefficient is not incremented. After all computer groups are checked, the group with the highest coefficient of matching GUIDs is selected. If the ratio of the coefficient to N is greater than or equal to the specified first threshold, the given computer 103 of FIG. 1 is added to this computer group, and the first list for the group is updated to account for the newly added computer as shown in block 210 in FIG. 2. In case of ambiguity, such as when the ratio is greater than or equal to the specified first threshold for multiple computer groups, or when the ratio is smaller than the specified first threshold for all computer groups, the second part of the algorithm is used as depicted in FIG. 4.

For every existing computer group 102 of FIG. 1, the second list 124 of FIG. 1 is created. Each GUID of the second list is compared to the list of GUIDs discovered on the given computer 103 of FIG. 1. If two GUIDs match, the coefficient that defines the number of matching components is incremented. If the GUIDs do not match, the coefficient is not incremented. For each computer group 102 of FIG. 1, the ratio of the coefficient to the length of the second list 124 of FIG. 1 is calculated. This ratio is then averaged with the ratio computed for the first list comparison, and the result is checked against a specified second threshold value. If the result corresponding to the second likelihood is greater than or equal to the specified second threshold value, the given computer 103 of FIG. 1, is added to the given computer group, and the first and second lists for the group are updated to account for the newly added computer as shown in block 210 in FIG. 2. In case the second likelihood exceeds the specified threshold for multiple computer groups or the second likelihood does not meet the specified threshold for any of the computer groups, the third part of the algorithm is used as depicted in FIG. 5.

For every existing computer group 102 of FIG. 1, the asset management tool on the central computer 110 of FIG. 1 creates a list of the component names of the resident software components 106 of FIG. 1. From this list, the first M most frequently used software components are chosen, where M is a predefined number. This results in the creation of the third list 126 of FIG. 1. Then, the Levenshtein algorithm is used to calculate the distance between the component names of the third list 126 of FIG. 1 and the component names of the software components 106 of FIG. 1 installed on the given computer 103 of FIG. 1. For each computer group 102 of FIG. 1, the Levenshtein distance is computed between its third list and the software component names of the given computer 103 of FIG. 1. These Levenshtein distances are then averaged, and the computer group with the greatest Levenshtein average is selected.

This greatest Levenshtein average is then in turn averaged with the second likelihood previously computed for the particular computer group 102 of FIG. 1, which was computed as shown in block 204 of FIG. 2. This new average of the Levenshtein average and the second likelihood gives rise to the third likelihood. If the third likelihood exceeds the specified third threshold, the given computer 103 of FIG. 1 is added to the particular computer group 102 of FIG. 1, and the first, second, and third lists for the group are updated to account for the newly added computer as shown in block 210 in FIG. 2. In case of ambiguity or when the third likelihood is smaller than the specified third threshold, the given computer 103 of FIG. 1 is added to a new computer group and the first list of N and the second list (outer top N blacklist) are calculated.

If the given computer 103 of FIG. 1 is added to a newly created computer group, a representative bundling rule of the software components 106 in FIG. 1 installed on it is created that is used in the auto-bundling algorithm by the asset management tool for future computers added to the newly created computer group. If the given computer 103 of FIG. 1 is added to a pre-existing computer group 102 of FIG. 1, the top N (first list) and outer top N blacklist (second list) are determined. Additionally, based on the auto-bundling rule for the given computer group, automated bundling is performed for the given computer 103 of FIG. 1. That is the computer will obtain the same bundling assignment proposition for the computer group 102 of FIG. 1 to which it is assigned. This is depicted in block 210 of FIG. 2 as well as in FIG. 6.

In an embodiment of the invention, a computer assigned to a computer group as described above may be updated with updated software components, based on dependencies between software components installed on the computer. For this purpose, an update routine common to computers in the computer group may be applied. For example, after a given computer is assigned to a computer group, the list of discovered software components of the given computer may be compared to the first list of software components most frequently installed on computers of the computer group, and an automated update routine may update to specified versions discovered software components that are also on the first list.

In another embodiment of the invention, license packages may be provided for bundles of software components, the selection of license packages being performed for computers assigned to a particular computer group, as described above. Alternatively, compliance with existing licensing arrangements may be checked, as computers assigned to a particular computer group may be assumed to comply with similar licensing rules. In one embodiment, software components without legal licenses appropriate for a particular computer group may be automatically uninstalled. For example, after a given computer is assigned to a computer group, the list of discovered software components of the given computer may be compared to a list of software components installed on computers of the computer group and compliance with licensing rules for the computer group may be enforced. For example, license packages for bundled software may be offered as an option; or unlicensed software components may be removed or deactivated; or existing licenses may be extended to unlicensed software components.

In yet another embodiment of the invention, integrity of the hardware and/or software environment of a computer that has been assigned to a computer group as described above may be verified. For example, a test suite designed to debug specific aspects of hardware and/or software may be run on computers of the computer group. Since for computers of a particular computer group the installed components are similar, statistically significant deviations from group averages may indicate a hardware or software problem. For example, routine regression testing may be enhanced to compute statistics on failure rates for computers of a particular computer group, and outliers may be tagged and/or reported for further scrutiny.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for assigning a given computer to a computer group of a set of computer groups, the method comprising:
    scanning, by a computer, software components installed on the given computer, resulting in a list of discovered software components of the given computer;
    for at least one computer group of the set of computer groups:
        obtaining, by the computer, a first list of software components most frequently installed on computers of the at least one computer group, wherein obtaining the first list comprises:
            obtaining, by the computer, a list of all the software components installed on computers of the computer group; and
            sorting, by the computer, the list of the software components according to how frequently the software components are installed on computers of the computer group, the first list comprising the first N most frequently used software components from the list, for a predefined number N; and
        comparing, by the computer, the first list with the list of discovered software components and, based on the comparison, computing a first likelihood that the given computer belongs to the at least one computer group; and
    in case only one of the first likelihoods exceeds a first threshold, assigning, by the computer, the given computer to the at least one computer group for which the first likelihood exceeds the first threshold.

2. A method in accordance with claim 1, further comprising:
    computing, by the computer, for each computer group of the set of computer groups, a respective first likelihood that the given computer belongs to a respective computer group;
    in case none of the respective first likelihoods for the respective computer groups exceeds the first threshold, or the respective first likelihoods for two or more respective computer groups exceed the first threshold, obtaining, by the computer, for each computer group, a second list of software installed on computers of the respective computer group, the second list including software components installed on computers of the respective computer group that are not included in the first list;
    for each computer group, comparing, by the computer, the second list with the list of discovered software components and, based on the comparison, computing a respective second likelihood that the given computer belongs to the respective computer group; and
    in case only one of the respective second likelihoods exceed a second threshold, assigning, by the computer, the given computer to the respective computer group for which the second likelihood exceeds the second threshold.

3. A method in accordance with claim 2, further comprising:
    in case none of the respective second likelihoods for the computer groups exceeds the second threshold or the respective second likelihoods for two or more computer groups exceed the second threshold, obtaining, by the computer, for each computer group a third list of software components installed on computers of the computer group, the third list including software components most frequently installed on the computers of the computer group;
    for each computer group, using, by the computer, a Levenshtein distance procedure to compare the third list with the list of discovered software components and, based on the comparison, selecting the computer group with an average closest Levenshtein distance match;
    for the computer group with the average closest distance match, using, by the computer, calculated Levenshtein distances and the second likelihood determined for the computer group to compute a third likelihood that the given computer belongs to the computer group; and in case the third likelihood exceeds a third threshold, assigning, by the computer, the given computer to the computer group for which the third likelihood exceeds the third threshold.

4. A method in accordance with claim 3, further comprising:
in case the third likelihood for the computer group does not exceed the third threshold, creating, by the computer, a new computer group in the set of computer groups and assigning the given computer to the new computer group.

5. A method in accordance with claim 1, wherein, in case the given computer is assigned to the at least one computer group for which the first likelihood exceeds the first threshold, the method comprises updating, by the computer, the first list of the computer group to account for the software components installed on the given computer.

6. A method in accordance with claim 2, wherein, in case the given computer is assigned to the respective computer group for which the second likelihood exceeds the second threshold, the method comprises updating, by the computer, the first and second lists of the computer group to account for the software components installed on the given computer.

7. A method in accordance with claim 3, wherein, in case the given computer is assigned to the respective computer group for which the third likelihood exceeds the third threshold, the method comprises updating, by the computer, the first list of the computer group to account for the software components installed on the given computer.

8. A method in accordance with claim 4, further comprising creating, by the computer, a new first list for the new computer group.

9. A method in accordance with claim 2, wherein for each computer group the union of the first and second lists includes all the software components installed on the computers of the computer group.

10. A method in accordance with claim 1, wherein
each of the discovered software components installed on the given computer is assigned a first globally unique identifier, GUID;
each of the software components of the first list is assigned a second GUID;
the comparison between the first list and the list of discovered software components comprises comparing, by the computer, the respective first and second GUIDs; and
computing of the first likelihood comprises calculating, by the computer, a ratio of the number of the matching first and second GUIDs to the number of software components included in the first list.

11. A method in accordance with claim 2, wherein:
each of the discovered software components installed on the given computer is assigned a first globally unique identifier, GUID;
each of the software components of the second list is assigned a second GUID;
the comparison between the second list and the list of discovered software components comprises comparing, by the computer, the respective first and second GUIDs; and
computing the second likelihood comprises calculating the ratio of the number of the matching first and second GUIDs to the number of software components included in the first list.

12. A method in accordance with claim 3, wherein obtaining the third list of software components most frequently installed on computers of the computer group comprises:
obtaining, by the computer, a list of all the software components installed on computers of the computer group;
sorting, by the computer, the list of software components according to how frequently the software components are installed on computers of the computer group, the third list comprising the first M most frequently used software components from the list, wherein M is a predefined number.

13. A method in accordance with claim 3, wherein the Levenshtein distance procedure comprises:
comparing, by the computer, the name combinations of the software components included in the third list and the list of discovered software components, the procedure resulting in a Levenshtein distance for each compared name combination;
calculating, by the computer, for each name combination the ratio between the Levenshtein distance and the highest length in the characters of the names in the name combination;
determining, by the computer, an average Levenshtein distance match as the arithmetic mean of all the ratios calculated for the computer group; and
determining, by the computer, the average closest Levenshtein distance match as the maximum of all the average Levenshtein distance matches.

14. A method in accordance with claim 13, wherein computing the third likelihood comprises calculating, by the computer, the mean of the average closest Levenshtein distance match and the second likelihood.

15. A method in accordance with claim 1, further comprising:
in response to assigning the given computer to the at least one computer group for which the first likelihood exceeds the first threshold:
obtaining, by the computer, predefined bundling rules for the at least one computer group, each bundling rule assigning combinations of the software components to bundled software products; and
for the given computer assigned to the at least one computer group for which the first likelihood exceeds the first threshold, determining, by the computer, the bundled software products installed on the computer using the bundling rules.

16. A method in accordance with claim 15, further comprising updating, by the computer, a software product list with information on the determined bundled software products, the software product list comprising, for the at least one computer group for which the first likelihood exceeds the first threshold, all the bundled software products installed on the computers of the computer group.

17. A computer system for assigning a given computer to a computer group of a set of computer groups, the computer system comprising:
one or more computer processors, one or more computer-readable storage media, and program instructions stored on one or more of the computer-readable storage media for execution by at least one of the one or more processors, the program instructions comprising:
program instructions to scan software components installed on the given computer, resulting in a list of discovered software components of the given computer;

for at least one computer group of the set of computer groups:
program instructions to obtain a first list of software components most frequently installed on computers of the at least one computer group, wherein obtaining the first list comprises:
program instructions to obtain a list of all the software components installed on computers of the computer group; and
program instructions to sort the list of the software components according to how frequently the software components are installed on computers of the computer group, the first list comprising the first N most frequently used software components from the list, for a predefined number N; and
program instructions to compare the first list with the list of discovered software components and, based on the comparison, program instructions to compute a first likelihood that the given computer belongs to the at least one computer group; and
in case only one of the first likelihood exceeds a first threshold, program instructions to assign the given computer to the at least one computer group for which the first likelihood exceeds the first threshold.

18. A computer program product for assigning a given computer to a computer group of a set of computer groups, the computer program product comprising:
one or more non-transient computer-readable storage media and program instructions stored on the one or more computer-readable storage media, the program instructions comprising:
program instructions to scan software components installed on the given computer, resulting in a list of discovered software components of the given computer;
for at least one computer group of the set of computer groups:
program instructions to obtain a first list of software components most frequently installed on computers of the at least one computer group, wherein obtaining the first list comprises:
program instructions to obtain a list of all the software components installed on computers of the computer group; and
program instructions to sort the list of the software components according to how frequently the software components are installed on computers of the computer group, the first list comprising the first N most frequently used software components from the list, for a predefined number N; and
program instructions to compare the first list with the list of discovered software components and, based on the comparison, program instructions to compute a first likelihood that the given computer belongs to the at least one computer group; and
in case only one of the first likelihood exceeds a first threshold, program instructions to assign the given computer to the at least one computer group for which the first likelihood exceeds the first threshold.

19. The computer program product of claim 18, further comprising:
program instructions to compute, for each computer group of the set of computer groups, a respective first likelihood that the given computer belongs to a respective computer group;
in case none of the respective first likelihoods for the respective computer groups exceeds the first threshold, or the respective first likelihoods for two or more respective computer groups exceed the first threshold, program instructions to obtain, for each computer group, a second list of software installed on computers of the respective computer group, the second list including software components installed on computers of the respective computer group that are not included in the first list;
for each computer group, program instructions to compare, the second list with the list of discovered software components and, based on the comparison, computing a respective second likelihood that the given computer belongs to the respective computer group; and
in case only one of the respective second likelihoods exceed a second threshold, program instructions to assign the given computer to the respective computer group for which the second likelihood exceeds the second threshold.

* * * * *